United States Patent Office 2,896,260
Patented July 28, 1959

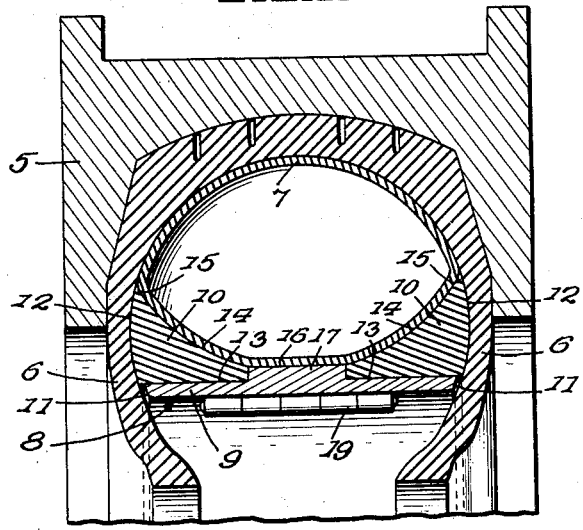

2,896,260

INSIDE CURING RIM

Donald M. MacMillan, Macon, Ga.

Application September 14, 1956, Serial No. 609,926

4 Claims. (Cl. 18—45)

In recapping and retreading tire casings, the casing is held in the curing mould by means of an inflatable air bag, and an inside metal curing rim is provided to receive the inward thrust of said air bag. This rim extends between the casing side walls and should rather tightly contact therewith but the side walls of different makes of tires have different thicknesses and therefore different wall-to-wall dimensions. This has heretofore required that tire recapping ad retreading establishments be equipped with a number of inside rims of different widths for each tire size and has necessitated that one size after another be tried until the one most suitable is found. Even then, there has frequently been sufficient gap between rim and casing side walls to allow chafing of the air bag against the rim edges, or the rim has fit so tightly as to jeopardize the air seal medium in the casing if the latter be of tubeless type.

To overcome such difficulties, it has been proposed that a thick flexible flap be employed between the air bag and the inside curing rim, thus requiring fewer rim widths by having the flap bridge any gaps between rim and casing side walls. This proposal, however, would not only necessitate that flaps of various sizes be kept on hand, but the time and inconvenience required to select a usable flap size in each case and then engage it with the air bag before placing the rim in position, would to a large extent counteract the advantage. For such reasons, therefore, the proposal has apparently been considered impractical by the tire retreading and recapping industry.

The present invention aims to provide a new and improved inside curing rim which may be manufactured of one standard relatively narrow width for each tire size and in which the rim body unitarily carries two resilient rings to outwardly flex when the air bag is inflated and effectively bridge any gaps between the edges of said body and the tire casing side walls. Thus, for any tire size, the inside curing rim and the resilient rings may be placed in position at a single operation, a great deal of time loss and inconvenience are obviated, there is no possibility of the air bag being injured by the rim, and the rim body need not contact with and possibly injure any air seal coating with which the tire casing may be provided, if of tubeless type.

With the above and other objects in view that will hereinafter appear, the nature of the invention will be more clearly understood by reference to the following detailed description, the appended claims and the several views illustrated in the accompanying drawing:

In the drawing:

Figure 1 of the accompanying drawing, is a radial sectional view showing one form of the improved inside curing rim in use, the resilient rings being flexed into tight contact with the side walls of a tire casing.

Figure 2 is a radial sectional view through the rim of Figure 1, showing the normal shape of the resilient rings.

Figures 3 and 4 are similar views showing different forms of construction.

In Fig. 1 a conventional curing mould 5 is shown, to receive a retreaded or recapped tire casing 6. The usual air bag 7 is shown, for holding the casing 6 solidly in the mould 5; and one of the improved inside curing rims is disclosed, in operative position and receiving the inward thrust of said air bag 7.

Three forms of construction are disclosed for the improved rim and each of these rims is generally designated at 8. All forms have certain generic structural characterisics which will be first described, after which the differences will be set forth.

The rim 8 comprises a substantially rigid circular body 9 and two resilient rings 10 unitary with said body 9. The body 9 is preferably formed from steel or aluminum but a suitable plastic could well be employed. The rings 10 may be of natural or synthetic rubber, or of any other suitable resilient and deformable material, "neoprene" for example.

The body 9 has circumferential edges 11 disposed at parallel planes. For each standard tire size, these edges 11 are spaced apart a distance less than the wall-to-wall dimension of any tire, regardless of the thickness of the side walls. Thus, the edges 11 need not contact with and possibly injure any air sealing medium with which the tire may be internally coated, if of tubeless type.

The two resilient rings 10 are disposed at opposite sides of a central plane between the body edges 11 and said rings are of substantially triangular or generally wedge shaped in cross section so as to be relatively stiff. These rings 10 have laterally facing sides 12 disposed at the edges 11 and preferably normally parallel. The rings 10 also have inner peripheral sides 13 snugly surrounding and cemented or vulcanized to the rim body 9. The rings 10 also have preferably outwardly and laterally curved outer peripheral sides 14 which extend from the central peripheral portion of the body 9 to the laterally facing sides 12 and meet the latter at acute angles, the sides 14 and 12 thus cooperating in providing the rings 10 with substantially feather edges 15 to flex against the casing side walls when the air bag 7 is inflated. The inner edges of the ring sides 14 merge into the outer surface 16 of the central peripheral portion of the rim body 9.

In Figs. 1 and 2, the rim body 9 is outwardly thickened at 17 between the rings 10, and the inner edges of said rings abut the edges of the thickened rim portion.

In Fig. 3, the rim body 9 has narrow flanges 18 along its edges 11 and abutting the laterally facing sides 12.

In Fig. 4 the central circumferential portion of the rim body 9 is of concavo-convex form in transverse section, the concave side being outwardly presented.

Each of the improved rims 8 is of sectional form as customary with such rims, to permit collapsing for insertion into and removal from a tire casing. The sections are commonly connected by hinges as indicated at 19.

Any form of the invention may be quickly and easily placed in position for use and will overcome troubles heretofore encountered. As the bag 17 is being inflated, the rings 10 become outwardly deformed into tight contact with the tire side walls and they then bridge the gaps between said side walls and the body edges 11 to insure a smooth-walled chamber for the air bag 7.

While preferences have been disclosed, it is of course possible to make variations within the scope of the invention.

I claim:

1. An inside curing rim for reception between the side walls of a retreaded or recapped tire casing to receive the inward thrust of the usual inflatable air bag used to hold the casing in a curing mould having inwardly directed side flanges; said rim comprising a circular generally cylindrical substantially rigid body having laterally presented circumferential edges disposed at parallel planes, and two relatively stiff but deformable and resilient rings unitarily connected with said body, said resilient rings surrounding said body at opposite sides of a plane disposed centrally between the aforesaid planes, said rings being of generally wedge shaped cross section and having inner cylindrical peripheral sides tightly surrounding and secured against said body, said rings having laterally facing wide and generally flat outer sides disposed at said edges of said body and adapted to be deformed into contact with the casing side walls upon inflation of the bag, said rings having outer outwardly and laterally curving peripheral sides which extend from the central peripheral portion of said body to said laterally facing sides and meet the latter at acute angles, said outer peripheral sides and said laterally facing sides cooperating in providing said rings with substantially feather edges to lie tightly against the casing side walls said generally wedge shaped rings being dimensioned so that the outer sides thereof will lie opposite the inner extremities of the inwardly directed side flanges of a mould when the curing rim is placed therein with the feather edges outwardly of said mould flange inner extremities and their inner peripheral sides inwardly of said mould flange inner extremities.

2. A structure as specified in claim 1; the central circumferential portion of said body being outwardly thickened between said rings, said outer peripheral sides of said rings merging into the outer surface of said thickened rim portion.

3. A structure as specified in claim 1; said circumferential edges of said body having integral flanges abutting the contiguous portions of said laterally facing sides of said resilient rings.

4. A structure as specified in claim 1; said body being of concavo-convex form in transverse section between said resilient rings, and having its concave side disposed outwardly, said outer peripheral sides of said resilient rings merging into said concave side.

References Cited in the file of this patent

UNITED STATES PATENTS 2,524,156    Bacon  ---------------- Oct. 3, 1950